Jan. 29, 1935.   R. H. HUMMERT   1,989,199

CHECK VALVE

Filed Oct. 30, 1933

INVENTOR,
Robert H. Hummert,
BY Howard D. Smith,
His ATTORNEY

Patented Jan. 29, 1935

1,989,199

UNITED STATES PATENT OFFICE 1,989,199

CHECK VALVE

Robert H. Hummert, Dayton, Ohio, assignor to The S. H. Thomson Manufacturing Company, Dayton, Ohio, a corporation of Ohio Application October 30, 1933, Serial No. 695,746

3 Claims. (Cl. 251—121)

This invention relates to new and useful improvements in check valves.

It is one of the principal objects of my invention to provide a check valve with a resilient and renewable seat to eliminate the noise incident to valves having elements with a metal to metal contact, and at the same time providing for the check valve a seat which will yieldingly engage it.

It is another important object of my invention to provide a renewable-resilient seat that may be removed and renewed without the use of reseating tools.

Another object of my invention is to provide a freely mounted cage for a valve such as a check ball in combination with a yieldable resilient seat to eliminate unequal wear on the outlet side of the cage and to promote a true seating of the valve.

When a check valve of this type is employed in installations using, for instance, hydrated lime soda ash for the treatment of water, the clogging of the cage and the formation of incrustations on the seat are obviated by the yieldable nature of the latter and the oscillations of the freely mounted cage.

Check valves subject to heavy incrustations will not corrode or cake under the conditions provided by my invention. However, when the valve seat and cage finally become worn, they can be easily and economically replaced without removing the valve body.

Other important and incidental objects of my invention will be brought out in the following specification and claims annexed thereto.

Figure 1:
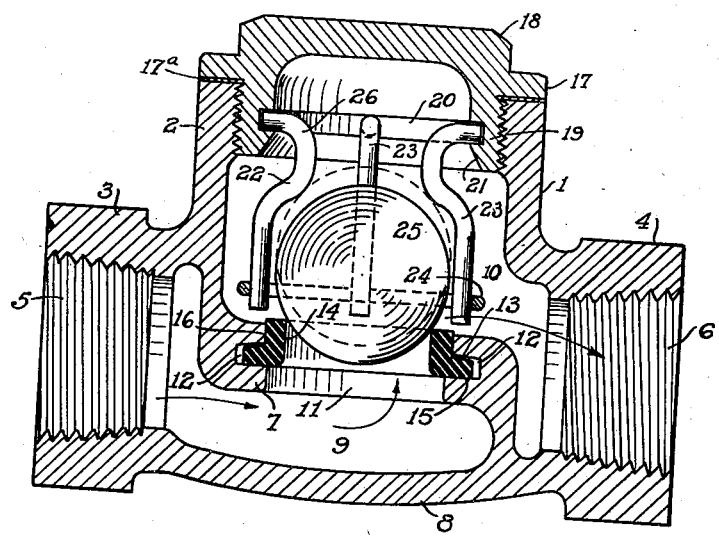
Figure 2:
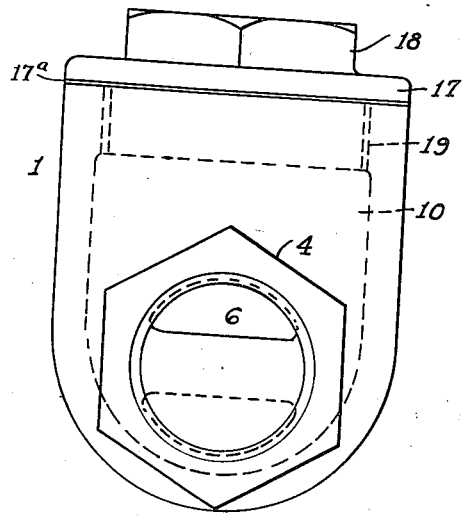
Figure 3:
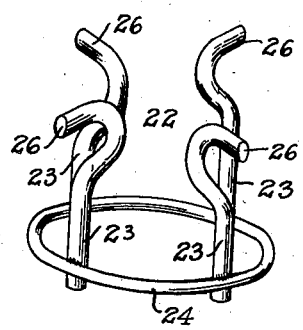

In the accompanying drawing illustrating my invention in its preferred form, Figure 1 is a longitudinal sectional view taken through the check valve. Figure 2 is an end view of the outlet end of the valve. And Figure 3 is a perspective view of the freely mounted cage.

Referring now to the drawing for a detailed description of my invention, the numeral 1 designates a check valve body having a center cylindrical cage-receiving boss 2. On each side of the latter are oppositely disposed hexagonal bosses 3 and 4 provided with threaded inlet and outlet apertures 5 and 6 respectively. (See Figures 1 and 2.)

Extending transversely of the valve body 1 is a seat supporting wall 7, providing between it and the bottom wall 8 of the body an inlet passage 9 that communicates with the inlet aperture 5. Above the wall 7 the boss 2 defines a vertical, cylindrical housing 10 communicating at one side thereof with the outlet aperture 6. (See Figures 1 and 2.)

In the wall 7, concentric with the housing 10, is a circular valve port 11 having at its center, between the top and bottom faces of the wall, an under-cut, concentric seat-receiving recess 12. The top face 13 of the latter is slightly inclined toward the port opening 11 and receives therein a removable, resilient, flanged circular seat 14 of semi-hard rubber or similar material. The seat 14, by virtue of its flexibility, may be easily inserted in or removed from, its support, a circumferential flange 15 thereon being received by the recess 12. The face of the seat 14 projects slightly above the wall 7, where it is further supported by the surrounding wall of a counterbore 16 slightly larger than the port opening 11.

The top open end of the housing 10 in the boss 2 is threaded, being concentric with the port 11 and closed by a flanged cap 17 having an outer hexagon shoulder 18 and an inner threaded shoulder 19 screwed into the housing 10. Between the cap 17 and valve body is a gasket 17$^a$.

The inner face of the cap 17 is recessed, and is provided with an undercut annular groove 20. Between the latter and the face of the shoulder 19, the recess is defined by a beveled shoulder 21.

The beveled shoulder 21 facilitates the assembly of a valve cage 22 with the cap 17. This cage 22 is formed of four circumferentially spaced, axial rods 23 held in spaced relation by an enclosing ring 24 to which they are welded or brazed, adjacent their lower ends. As shown at Figures 1 and 3, the upper free ends of the rods 23 are formed inwardly to limit the upward travel of a check ball 25, positioned within the cage 22, and then the ends 26 are formed outwardly at right angles to their lower ends. The rods 23, when secured to the ring 24, are yieldable at their outer free ends; and when pressed against the beveled shoulder 21 of the cap 17, these free ends 26 will yield sufficiently to enter the groove 20 in which they are retained by their spring tension. (See Figures 1 and 3.)

When the check valve is in service, the fluid enters the valve body 1 through the inlet opening 5, the passage 9 and the valve port 11, and is discharged through the outlet opening 6. (See Figures 1 and 2.)

When fluid passes through the valve, the check ball 25 will be lifted thereby from its resilient seat 14 into the cage 22. When the movement of the fluid ceases, the ball 25 will drop back by gravity, against its resilient seat 14.

The weight of the check ball 25 will not only effectively seal the opening between it and tis seat 14, but the impact of the ball with the resilient seat will also break up and loosen incrustations that may form upon the latter.

When the ball 25 is lifted, its upward travel is limited by the constricted space between the rods 23, as indicated by the dotted line position of the ball.

The impact of the ball with the cage 22 on its upward travel, will tend to oscillate the latter to prevent accumulation of deposits thereon and produce a uniform wear upon the cage.

The impact of the ball with its resilient seat is quiet, thus eliminating the objectionable noise and vibration of the present metal to metal contact of the valve elements usually employed with fluid compressors. Also with this valve-seat structure, a yieldable seat is provided, assuring a tight seal between the latter and the check ball.

As previously set forth, the oscillating cage and renewable seat provide a self-cleaning, leak-proof check valve whose elements which are subject to wear, may be quickly renewed without the use of reseating tools.

I do not wish to be limited to the details of construction and arrangement herein shown and described, and any changes or alterations may be made therein within the scope of the subjoined claims.

Having described my invention, I claim:

1. In a device of the type described, a valve body having an inlet passage and an outlet passage, a wall separating said passages and having a port therein, the wall of said valve body defining said port being formed with an annular groove, a removable, resilient flanged valve seat supported in said groove, a removable cap for said valve body, having a recess therein, a shoulder in said recessed cap, a cage loosely supported by said shoulder for an oscillatory movement, and valve means within said cage for engagement with said seat, and adapted to contact said cage, when raised above the seat by the incoming fluid.

2. In a device of the type described, a valve body having an inlet passage and an outlet passage, a wall separating said passages and having a port therein, a resilient seat supported in said port, a removable cap for said valve body having a recess therein, an internal shoulder in said recessed cap, spaced members forming a cage, outwardly formed free ends on said members loosely depending from said shoulder for oscillation around it, and a ball within said cage to engage the seat to close the port, said ball when raised by the incoming fluid, being adapted to contact said cage for the purpose specified.

3. In a device of the type described, a valve body having an inlet passage and an outlet passage, a wall separating said passages and having a port therein, a valve seat for said port, a cap for said valve body, a shoulder in said cap, a cage loosely supported by said shoulder for an oscillatory movement, and a valve within said cage for engagement with said seat, and being adapted to contact the cage when raised above the seat by the incoming fluid.

ROBERT H. HUMMERT.